US010061718B2

(12) United States Patent
Colp et al.

(10) Patent No.: US 10,061,718 B2
(45) Date of Patent: Aug. 28, 2018

(54) PROTECTING SECRET STATE FROM MEMORY ATTACKS

(75) Inventors: Patrick J. Colp, Vancouver (CA);
Himanshu Raj, Issaquah, WA (US);
Stefan Saroiu, Redmond, WA (US);
Alastair Wolman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 522 days.

(21) Appl. No.: 13/535,578

(22) Filed: Jun. 28, 2012

(65) Prior Publication Data
US 2014/0006805 A1 Jan. 2, 2014

(51) Int. Cl.
G06F 21/78 (2013.01)
G06F 12/14 (2006.01)
G06F 21/79 (2013.01)

(52) U.S. Cl.
CPC .......... *G06F 12/1425* (2013.01); *G06F 21/78* (2013.01); *G06F 21/79* (2013.01)

(58) Field of Classification Search
CPC .. G06F 21/72; G06F 2221/2107; G06F 21/31; G06F 21/78; G06F 21/79; H04L 63/08; G11B 20/00086; G11B 20/0021
USPC ......... 380/223, 228, 239, 277–278; 713/150, 713/164–165, 167, 171, 182, 189–193; 726/2, 21–22, 26–27
See application file for complete search history.

(56) References Cited

U.S. PATENT DOCUMENTS

| | | | | |
|---|---|---|---|---|
| 4,530,049 A | * | 7/1985 | Zee | G06F 9/4426 711/132 |
| 6,393,565 B1 | * | 5/2002 | Lockhart | G06F 21/602 380/277 |
| 7,552,255 B1 | * | 6/2009 | George et al. | 710/58 |
| 2004/0202317 A1 | * | 10/2004 | Demjanenko | H04L 9/0631 380/28 |
| 2006/0129514 A1 | * | 6/2006 | Watanabe | G06F 21/10 |
| 2007/0150752 A1 | * | 6/2007 | Kudelski | 713/190 |
| 2008/0052532 A1 | * | 2/2008 | Akkar | G06F 9/3004 713/189 |
| 2008/0263362 A1 | * | 10/2008 | Chen | G06F 21/31 713/184 |
| 2011/0125965 A1 | * | 5/2011 | Thomas | G06F 3/0605 711/114 |
| 2011/0246764 A1 | * | 10/2011 | Gamez | G06F 21/41 713/155 |

(Continued)

OTHER PUBLICATIONS

Colp et al., "Protecting Data on Smartphones and Tablets from Memory Attacks", pp. 177-189 (Year: 2015).*

*Primary Examiner* — Thaddeus J Plecha

(57) ABSTRACT

Described is a technology by which classes of memory attacks are prevented, including cold boot attacks, DMA attacks, and bus monitoring attacks. In general, secret state such as an AES key and an AES round block are maintained in on-SoC secure storage, such as a cache. Corresponding cache locations are locked to prevent eviction to unsecure storage. AES tables are accessed only in the on-SoC secure storage, to prevent access patterns from being observed. Also described is securely preparing for an interrupt-based context switch during AES round computations and securely resuming from a context switch without needing to repeat any already completed round or round of computations.

20 Claims, 6 Drawing Sheets

(56) References Cited

U.S. PATENT DOCUMENTS

| | | | | |
|---|---|---|---|---|
| 2012/0311204 A1* | 12/2012 | Sugimoto | ............... | G06F 3/061 |
| | | | | 710/74 |
| 2013/0109436 A1* | 5/2013 | Tat et al. | ........................ | 455/558 |
| 2013/0111605 A1* | 5/2013 | Maeda | .................... | G06F 21/60 |
| | | | | 726/27 |
| 2013/0124874 A1* | 5/2013 | Kudelski | ................. | G06F 21/70 |
| | | | | 713/189 |

* cited by examiner

PROTECTING SECRET STATE FROM MEMORY ATTACKS

BACKGROUND

Most smartphones and tablets use an ARM System-on-Chip (SoC) architecture. To protect sensitive data, in one protection model the ARM SoC provides a hardware-based isolation environment (e.g., TrustZone®) for running trusted services on the handheld device, in which running services are able to keep their secret state in RAM while the device is running.

However, this protection model has a significant vulnerability, in that once a relatively sophisticated attacker with appropriate resources has physical access to a mobile device (e.g., steals a smartphone), the attacker can try to read the RAM contents that stores these trusted services' secret state. Such attacks are thus directed towards stealing secret state, including AES cryptographic keys. Different ways to attack and read RAM include cold boot attacks, bus monitoring attacks and DMA attacks.

In a class of attacks referred to as cold boot attacks, the attacker (adversary) is able to physically extract the RAM from within a mobile device and read its contents to retrieve the cryptographic keys. This attack is possible because of the RAM remanence effect in which residual data remains into RAM long after the RAM has lost power. Disk encryption systems popular on contemporary personal computers/laptops are susceptible to cold boot attacks.

Another approach is to force the device to reboot a different operating system that dumps out the memory contents, for systems where the firmware does not automatically clear the memory on reboot.

In another class of attacks referred to as DMA attacks, a DMA-capable peripheral that manipulates the DMA controller is used to read arbitrary memory regions. On certain I/O buses, such as Firewire® and Thunderbolt™, this can be done without any cooperation from the processor or the operating system. These attacks may exploit any of several DMA interfaces. The mobile device does not even need to be unlocked, since as long as the device running, its DMA controller can be programmed over a DMA interface. One mechanism that can be used to defend against such attacks is by using an I/O memory management unit found on many contemporary personal computers and laptops, often referred to as an IOMMU, in which the operating system programs the IOMMU to restrict what memory regions different DMA-capable I/O devices can access. Despite IOMMU's popularity on personal computers and laptops, IOMMUs are not yet present on most other mobile devices today. Moreover, IOMMUs cannot authenticate the DMA devices, whereby they are susceptible to a spoofing attack in which a malicious DMA device can impersonate another device. Thus, to be effective, an IOMMU needs to be present and programmed to deny access to all DMA devices.

Bus monitoring attacks refer to yet another class of attacks, in which the attacker attaches a bus monitor to the memory bus and waits for the secret data (such as cryptographic keys) to be loaded from RAM into the CPU, or vice-versa. With disk encryption systems, a simple reboot ensures that the AES encryption keys are loaded into RAM, as they are needed to start decryption of the disk volumes upon startup.

Notwithstanding, bus monitoring attacks may be effective even against a system that does not even keep the AES keys (or any other secrets) in RAM. This is because most efficient AES implementations rely on caching pre-computation (e.g., data tables) to speed up encryption. Although this pre-computed state is not secret, the way in which the state is accessed during AES encryption (the access pattern) does leak valuable information about the encryption key; for example, such information may be used to significantly reduce the number of possible values for the encryption key. Attempts to protect against this vulnerability heretofore have not been straightforward, as pre-computed state is much larger than the encryption keys, significantly increasing the size of the secrets that need to be protected.

One way to mitigate such attacks is to use encrypted RAM. However, deploying the hardware needed for encrypted RAM is expensive and not practical, at least not presently. A software-based solution is thus desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology to prevent memory attacks. In one aspect, protected data, comprising secret state and access-protected state, is maintained in on-SoC secure storage. Secret state is not allowed to be written to unsecure storage, while access-protected state is not accessed from unsecure storage during encryption or decryption processing operations. During encryption or decryption processing, the secure storage is accessed with respect to the secret state and the access protected state.

In one aspect, performing encryption or decryption processing comprises performing AES encryption rounds, or verifying a personal identification number (PIN).

In one aspect, maintaining the protected data in on-SoC secure storage comprises maintaining the protected data in lines of cache, including locking each cache line containing a subset of the protected data to prevent eviction from the cache. Locking the cache line occurs before writing of the secret data to the cache line. Meaningless data is written over the secret data in the cache line before unlocking the cache line.

In one aspect, on-SoC secure storage, unsecure memory, and state protection logic coupled to the on-SoC secure storage are described. The state protection logic is configured to maintain AES secret state comprising a key, and, during AES encryption rounds, to maintain a round block in the on-SoC secure storage. The state protection logic is further configured to prevent the secret state from entering the unsecure memory.

In one aspect, secret state is protected from entering unsecure memory, including locking a cache line of an on-SoC cache, and writing the secret state into the cache line only after locking the cache line. A cache line containing secret state is unlocked only after writing meaningless information over the secret state.

In one aspect, there is described performing at least one AES computation round, and securely maintaining a round block comprising computations for a latest round in the cache in a locked state that prevents eviction of the round block to unsecure storage. A round index (round tracking information) tracks the completed round. Described is preparing for a context switch, including saving the round index, saving the round block to another secure storage, and clearing CPU state.

In one aspect, there is described resuming AES computations, including securely restoring the round block to the cache in a locked state that prevents eviction of the round block to unsecure storage, securely restoring a key to the cache in a locked state that prevents eviction of the key to unsecure storage, reading the round index to determine the completed round, and performing a next AES computation round based upon the round block and the round index.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects described herein are generally directed towards a technology that prevents memory attacks, including those set forth above, by never storing secret state in unsecure memory such as RAM or the like. Further, other state is access protected, in that while certain pre-computed state such as data tables may be present in RAM at times, this pre-computed state is never accessed while in RAM.

In one example implementation, there is provided an AES-compliant library for ARM SoC devices in which the encryption key is never stored in RAM. Instead, the library stores the key in an on-SoC memory such as the L2 cache, while ensuring that any computations and operations are performed such that the key is never copied to RAM, nor any access-protected state allowed to have its access patterns determined. Thus, the library allows any service (whether trusted or not) to perform AES encryption without being subject to the RAM attacks set forth above.

It should be understood that any of the examples herein are non-limiting. For one, while an ARM SoC-type mobile device is used as an example of a suitable device for implementing the technology described herein, other devices may similarly benefit. Also, while AES encryption-related data (e.g., including an AES encryption key) is used as an example of secret state that is not stored in RAM, other secret state (e.g., a device personal identification number, or PIN) may be protected in a like manner. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data protection in general.

Figure 1:
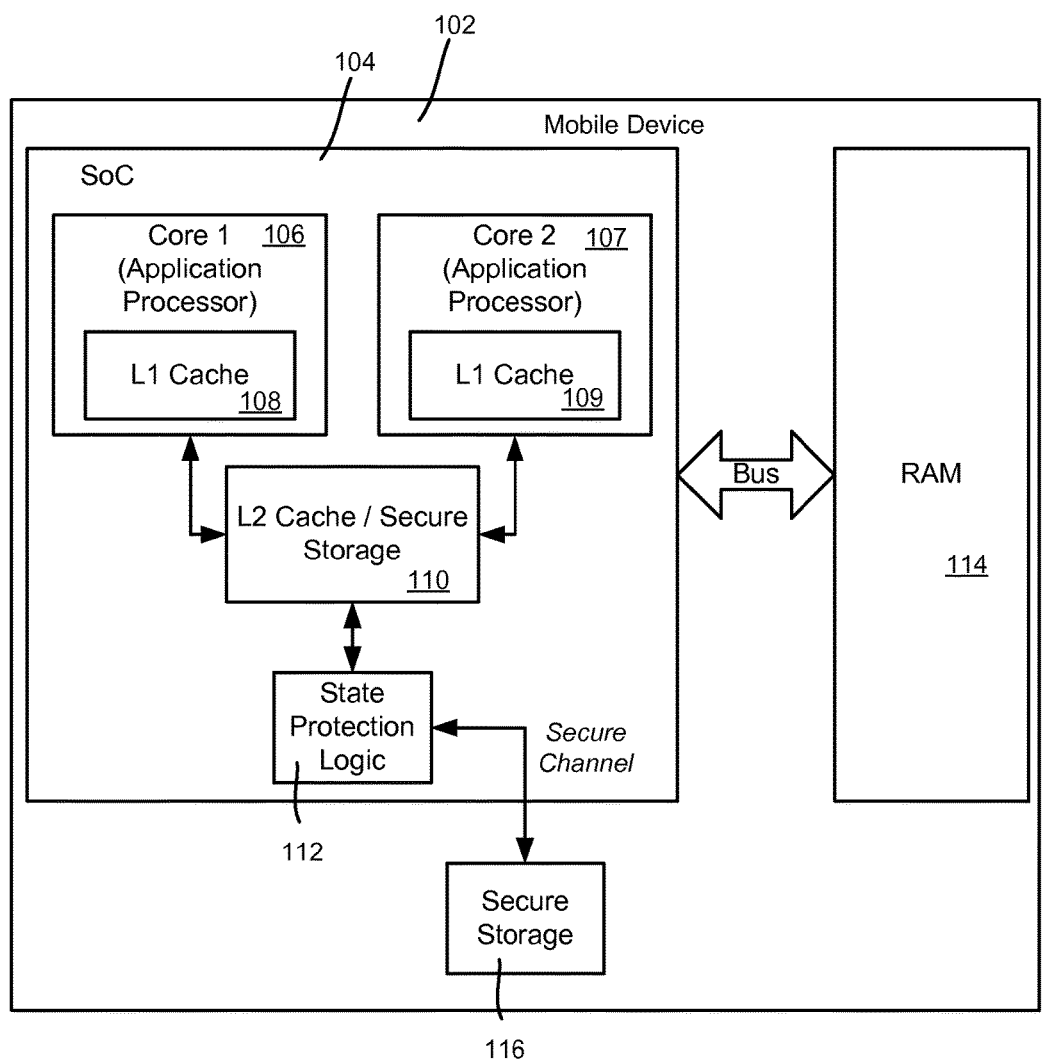
FIG. 1 is a representation of an example device configured with a System-on-Chip and secure memory used for preventing memory attacks, according to one example embodiment.

FIG. 1 shows a block diagram comprising an example implementation in which a mobile device 102 such as a user's cellular phone or tablet includes a System-on-Chip (SoC) component 104 having one or more processors/cores thereon. Two such cores 106 and 107, each with an L1 cache 108, 109, respectively, are shown in FIG. 1 for purposes of illustration, although any number of cores may be present. The SoC component 104 also includes an L2 cache 110 (and possibly other on-SoC secure storage, such as secure RAM). State protection logic 112, described herein, may be deployed in a tamperproof way into a secure execution environment, represented in FIG. 1 as on the SoC 104.

With respect to deployment, in one implementation the operation is the same as upgrading legacy AES software on a device, (which already occurs, for example, when a bug is discovered that needs to be fixed). Moreover, the state protection logic 112 operates transparently to other system or software that uses AES, and thus such other system or software need not be recompiled or modified in order to take advantage of the technology described herein.

As will be understood, to protect secret state, the technology herein comprises the state protection logic 112 (e.g., software or firmware) that has access to such on-SoC secure storage. As described herein, "on-SoC secure storage" comprises any processor cache that can be locked with respect to data eviction, whether considered part of the core or not, and/or any other on-SoC volatile or non-volatile memory, whether or not it is external to the core.

Note that one possible alternative to provide secure storage is to use a secure co-processor, such as a Trusted Platform Module (TPM), that provides a "sealed storage" abstraction. However, even if present on a mobile device, such a secure co-processor needs to store sensitive state and read it into registers or the like each time the sensitive state is needed, which may lead to a severe performance penalty because contemporary TPM chips do not have high performance characteristics.

A feasible alternative is to use on-SoC RAM that is typically present on the SoC component 104. However, in order to protect their firmware from malware, mobile devices are often configured so as to not expose this RAM to the operating system that is booting on the device. Also, on-SoC RAM is typically very limited in size, and mobile manufacturers are reluctant to dedicate on-SoC RAM to the needs of application-level software. Thus, while practical, device manufacturers need to modify their technology and schemes to facilitate the technology described herein.

Another alternative for secure storage is using a cache such as the L2 cache 110 of the SoC 104 as the on-SoC secure storage. However, a problem with using the L2 cache (or any other similar cache) is that the cache is backed in RAM 114 using write-through or write-back caching, in which data are evicted from the cache to RAM based on an eviction policy.

More particularly, with direct mapped caches, a cache line is evicted to and read back from a corresponding amount of memory in a RAM location reserved for that line. With set associative caches (or more simply associative caches), each line of data in RAM may correspond to a set (e.g., two, four or eight) of cache slot locations per index entry, whereby eviction only takes place when all such slots of a set are full.

Contemporary technology provides the ability to lock a cache line to prevent it from being evicted to RAM, which is a feature designed to provide predictable processing times. Described herein is another use for cache locking, namely locking protected (e.g., AES-sensitive) state into the cache, comprising the L2 cache 110 in one example implementation (although it is understood that the state protection logic may use any on-SoC secure storage). This includes secret state and access-protected state.

Figure 2:
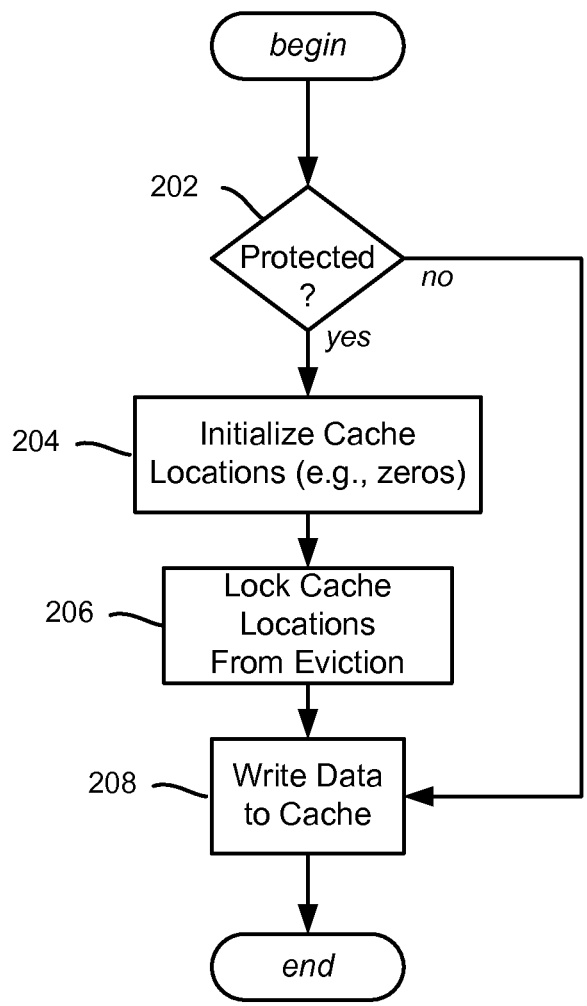
FIG. 2 is a flow diagram comprising example steps for using a cache as a secure memory via cache locking, according to one example embodiment.
Figure 3:
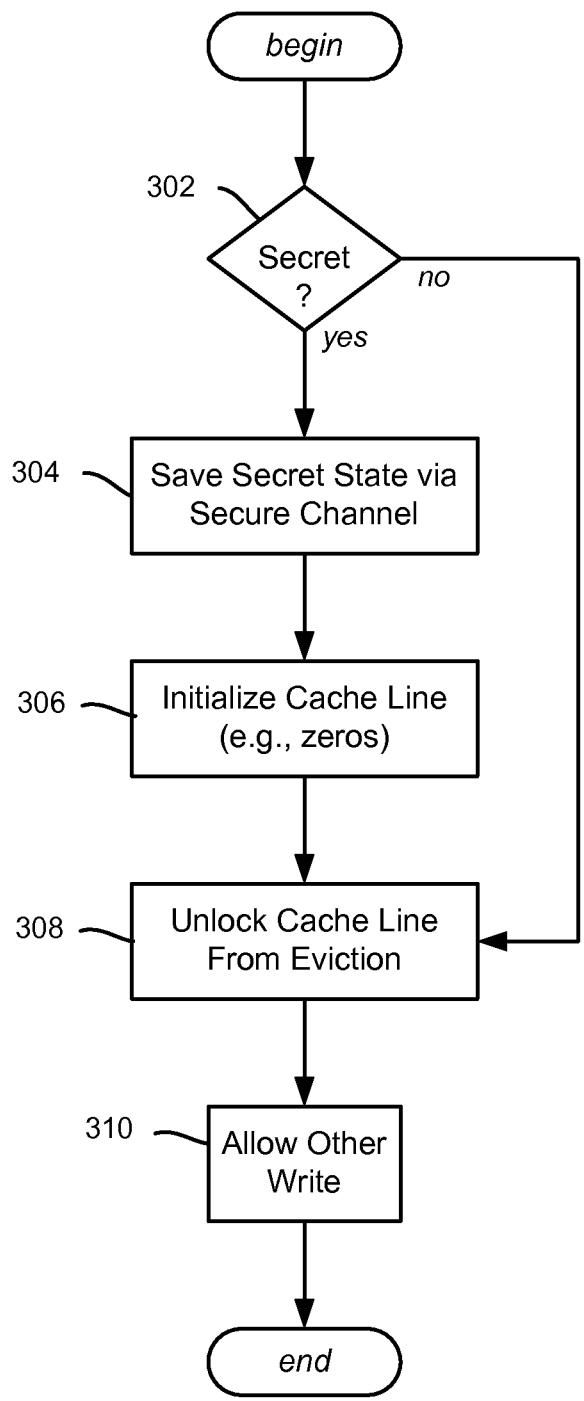
FIG. 3 is a flow diagram comprising example steps for using a cache as a secure memory via cache locking and secure unlocking, according to one example embodiment.

By locking protected state into the cache 110, the state protection logic 112 ensures that secret state is never written to RAM, and, as described below, access-protected data is never accessed while in RAM during AES-related operations. This is generally exemplified in FIG. 2, beginning at step 202 where the state protection logic 112 determines whether data is protected; (if not, the data may simply be written into the cache line at step 208) If so, via steps 204 and 206, the cache line to be written is initialized to zero, and the cache line locked from eviction. Then the data is written to the cache at step 208.

If a cache line containing secret state needs to be unlocked, before unlocking that cache line the state protection logic 112 copies the line over a secure channel to other secure storage 116 (shown in FIG. 1 as incorporated into the device, but possibly remote), and erases the cache line's contents (e.g., initializes the data to zero). This is generally exemplified in FIG. 2, beginning at step 302 where the state protection logic 112 determines whether data is secret; (if not, the cache line may be unlocked at step 308; note that access protected state may be unlocked as long as encryption/decryption-related access in RAM is not possible outside of the secure storage). If secret, via step 304 the state protection logic 112 copies the line to other secure storage 116 (FIG. 1). At step 306 and 308, the cache line to be unlocked is initialized to zero, and the cache line unlocked, allowing eviction. Then other data may be written to the now unlocked cache line at step 310.

Note that while caches are relatively large, on the order of several megabytes, locking individual cache lines effectively reduces the size of the cache available to the rest of the system and can thus adversely affect the performance of the mobile device overall. Thus, set associative caching that locks one or more, but not all, of the available slots for a set of cache lines, is one practical implementation for securely storing secret state that does not tend to overly hurt the performance of the mobile device.

In one example implementation, when encrypting one single 128-bit block, for example, the state protection logic 112 uses the advanced SIMD extension (known as NEON) instructions to store the AES state. Most modern smartphones are equipped with ARM SoC's that offer NEON instructions; NEON's role is providing acceleration for media and signal processing applications. NEON offers a set of 32 registers, 64-bit wide that can be used in dual-view, becoming effectively 16 registers, 128-bit wide. The state protection logic 112 may exploit this dual-view mode to accelerate its encryption. As is known in AES, encryption operations occur in a number of computational rounds, e.g., on the order of twelve. In this dual-view mode, certain operations become simple 128-bit instructions (e.g., XOR-ing a round key with the current input block during one round).

On encryption, the state protection logic 112 starts by loading sensitive state (e.g., the encryption key, the round block, the S-box, Rcon, and round tables) in the cache 110 and locking the appropriate cache locations. Note that while enabling cache locking to read one or more memory addresses and then disabling cache locking are straightforward operations, cache locking as used herein is not trivial, because cache data is otherwise backed in RAM and this state cannot be read from RAM.

Instead, enough secure memory regions to store the secret AES state are allocated, and the relevant locations in the cache 110 are locked from eviction via cache locking. These memory regions (filled with random data) are read into the cache 110 by writing the secret AES state into these memory regions, which effectively places the secret state into the cache 110. Because the cache 110 is locked, these writes cannot be relayed to RAM 114 in accordance with keeping the state protected. As described above, when cache locking needs to be disabled, any secret state that needs to be saved is stored over a secure channel to the secure storage 116, and memory regions erased (e.g., zeroed-out), before cache locking is disabled. Various secure storage technologies may be used (e.g., hardware such as a trusted platform module (TPM) chip, Replay Protected Memory Block (RPMB)/ Embedded MultiMediaCard (eMMC), a secure disk location, a secure network/cloud location) to provide the secure channel and secure storage. Note that use of such storage is relatively slow, however as described herein, by saving only the key and certain state data, the amount securely saved may be only a small amount of the data needed for AES encryption and decryption operations.

Turning to efficient operation that avoids a severe performance penalty with respect to state protection, note that there are different types of state used in the AES computation, namely public, secret, and access-protected as defined herein. The state protection logic 112 does not store secret state in RAM, nor does it access access-protected state while in RAM at any time that encryption/decryption operations that use that access-protected state are occurring.

With respect to performance, including performance of other software running on the mobile device, the technology integrates with the rest of the system to have little or no practical impact on the operation and performance of other processes. The state protection logic 112 is configured to facilitate low latency and high throughput with respect to encryption and decryption operations, (otherwise the technology would be limited and less desirable despite its protection benefits).

For example, interrupts may be disabled to prevent pre-emption of secret state to RAM. However, disabling interrupts affects the performance of the rest of the system, and thus this approach is not used. Rather, the handling of interrupts along with their corresponding context switching is allowed.

Thus, another aspect of protection is handling context switches, because if not handled, on a context switch the secret state (e.g., the CPU state comprising contents of registers) is otherwise preempted and written to RAM (i.e., pushed on the stack). One solution is to rewrite the interrupt service routines (ISRs) so as to zero-out any secret state as part of the context switch, and restart encrypting the round block from the first round. However this wastes the computation performed before the context switch, a highly frequent operation, and thus provides too high a performance penalty given contemporary device resources.

To avoid such a performance penalty, a different restarting model is used. Instead of starting from the beginning of the entire encryption-related operations, the restart occurs only from the beginning of the encryption round that was executing when the context switch occurred. To this end, at the beginning of each round, the intermediate state needed to restart that round is saved into the cache 110. More particularly, the round block containing the state of the latest round and the round index are saved to the cache 110, but not the round tables, S-box, and Rcon structures because these were already placed in the cache and they do not change throughout the entire encryption process. Note however that these structures (the round tables, S-box, and Rcon) may be unlocked to free up cache space for performance reasons. Further note that the round block is locked from eviction in the cache, but the round index is not secret and need not be locked in the cache. When the context switch occurs, the interrupt service routines zeroes out the registers used by AES before continuing the rest of the interrupt service routines operation.

Figure 4:
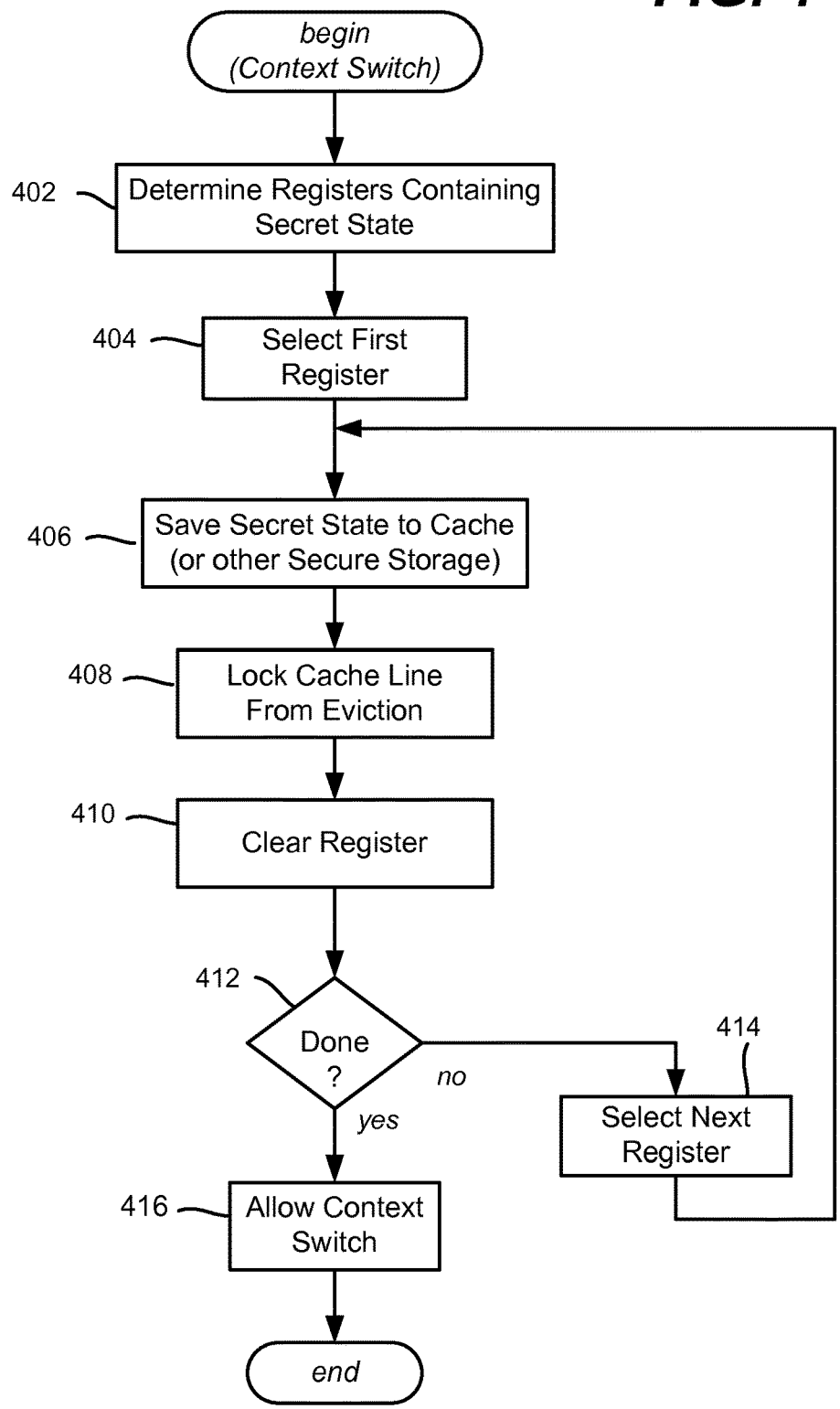
FIG. 4 is a flow diagram representing example steps that may be taken to securely prepare for a context switch, according to one example embodiment.

FIG. 4 summarizes context switching operations by way of example steps, beginning at step 402 where the CPU state (in CPU registers) that corresponds to secret state is determined, e.g., these registers may be known in advance to the state protection logic. For each such register, (steps 404, 412 and 414), secret state is saved to the cache at step 406, with the cache line locked from eviction as described above (step 408). Step 410 then clears the register. When the registers are done being saved and cleared, step 412 branches to step 416 to allow the context switch.

Figure 5:
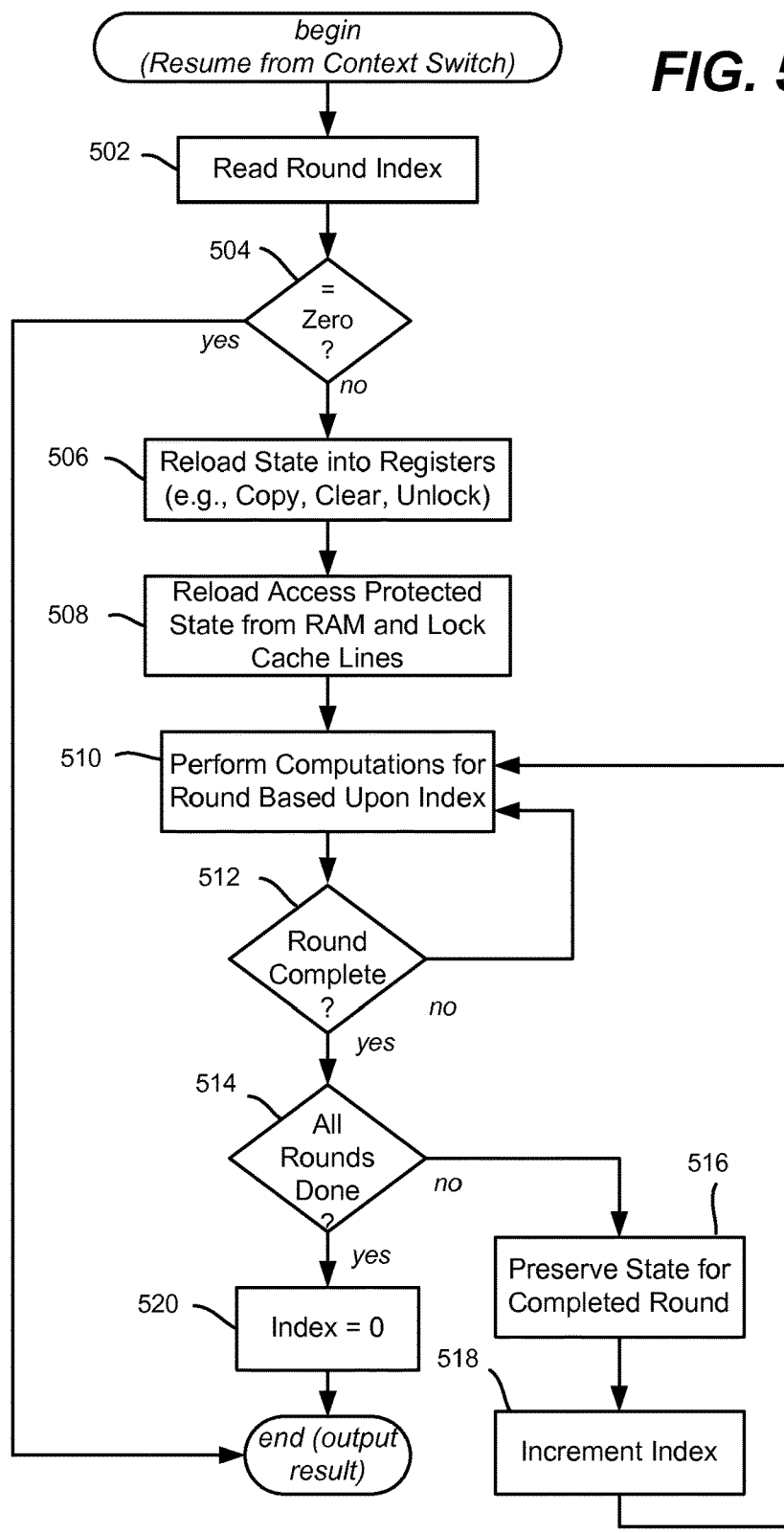
FIG. 5 is a flow diagram representing example steps that may be taken to securely resume from a context switch, according to one example embodiment.

As described above, sufficient information is preserved to avoid restarting an encryption operation from the beginning. Thus, as exemplified in FIG. 5, upon resuming encryption after an interrupt/context switch, the state protection logic 112 checks the value of the round index (step 502), and if the round index is not zero at step 504, loads the past computation state data from the cache into the registers and resumes the computation with the next round, as represented via step 506. If any access-protected data was unlocked to free up cache space, step 508 restores the access-protected data to the cache, and locks the corresponding lines; there is thus no accessing of the access protected data outside of the cache, whereby access patterns cannot be observed.

Note that when a round completes at step 512, other than the last round (step 514), the state information tracking that round, including the round index, is preserved via steps 516 and 518 so that if another context switch occurs, the logic knows where to resume computations. When the rounds are done, the index is initialized to zero at step 520. Encryption data (the result) may be output as appropriate.

Thus, as described herein, AES is implemented in a way in which AES needs minimal state. For this, only two pieces of secret state are stored, namely the encryption key and the round block. The other state that needs to be protected, such as the round tables, the S-box, and the Rcon, may be computed dynamically for each access, however, this is generally too slow to be practical.

Thus, the amount of state stored versus speed/dynamic computations may be traded off according to a given implementation's needs. For example, in one implementation, the state protection logic 112 may be configured to implement a minimal-state AES implementation, which only needs 32 bytes of secret state for AES-128 encryption. As another example, this minimal state may be traded off for speed, e.g., the state protection logic 112 may implement a faster version of AES that keeps more (or possibly all) of its pre-computed state. If all AES state is kept, a fast AES implementation is provided, but needs 8,992 bytes of secret state for AES-128. Different amounts of information may be kept versus computed dynamically, to provide a desired tradeoff of computation speed versus state reduction.

Although AES was described, a personal identification number (PIN), such as the ones used to perform screen unlock on smartphones and tablets, may benefit from the technology described herein. Cache locking allows the operating system to verify the PIN without exposing the PIN to RAM.

EXAMPLE OPERATING ENVIRONMENT

Figure 6:
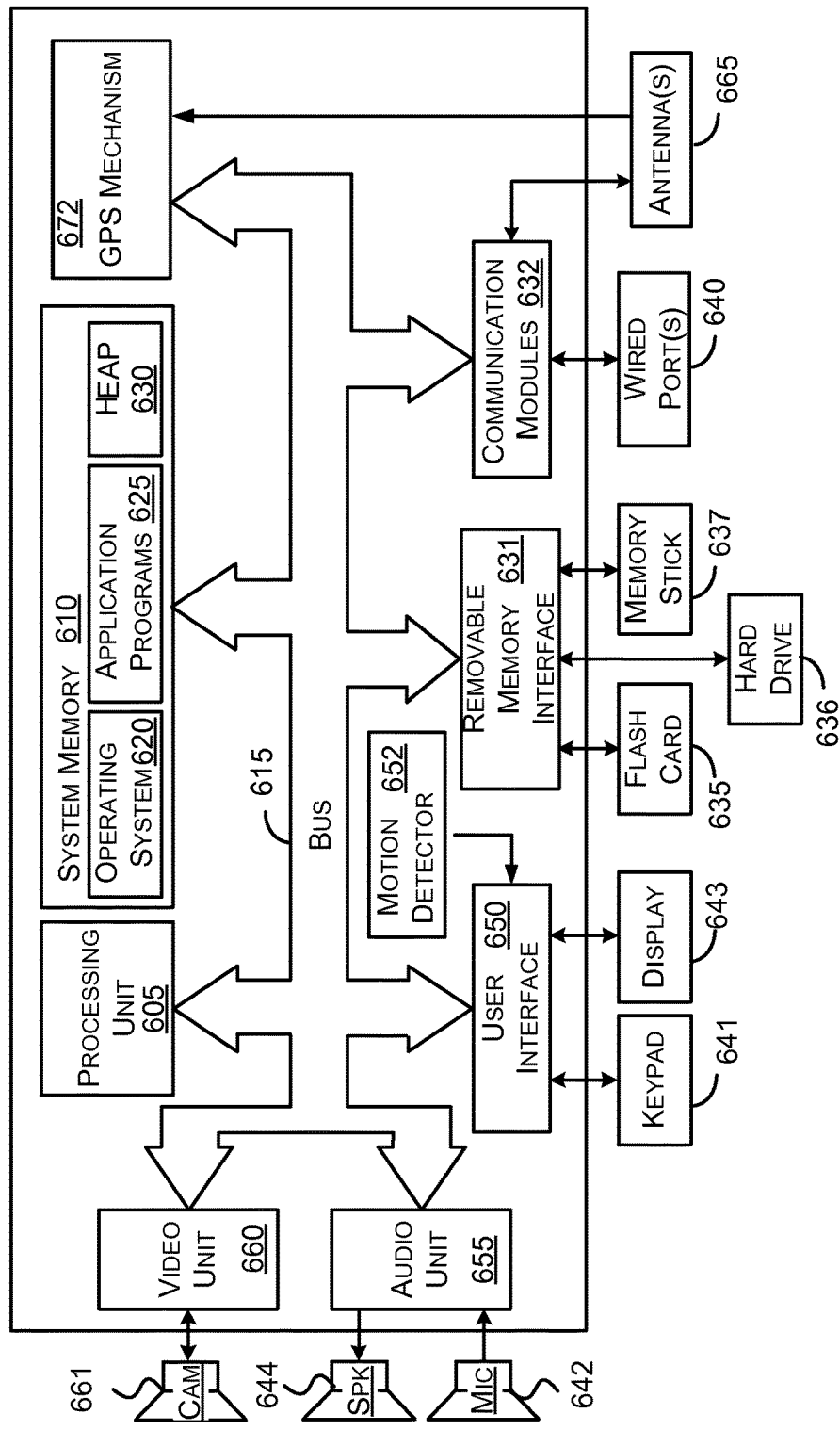
FIG. 6 is a block diagram representing an example computing environment, in the form of a mobile device, into which aspects of the subject matter described herein may be incorporated.

FIG. 6 illustrates an example of a suitable mobile device 600 on which aspects of the subject matter described herein may be implemented. The mobile device 600 is only one example of a device and is not intended to suggest any limitation as to the scope of use or functionality of aspects of the subject matter described herein. Neither should the mobile device 600 be interpreted as having any dependency or requirement relating to any one or combination of components illustrated in the example mobile device 600.

With reference to FIG. 6, an example device for implementing aspects of the subject matter described herein includes a mobile device 600. In some embodiments, the mobile device 600 comprises a cell phone, a handheld device that allows voice communications with others, some other voice communications device, or the like. In these embodiments, the mobile device 600 may be equipped with a camera for taking pictures, although this may not be required in other embodiments. In other embodiments, the mobile device 600 may comprise a personal digital assistant (PDA), hand-held gaming device, notebook computer, printer, appliance including a set-top, media center, or other appliance, other mobile devices, or the like. In yet other embodiments, the mobile device 600 may comprise devices that are generally considered non-mobile such as personal computers, servers, or the like.

Components of the mobile device 600 may include, but are not limited to, a processing unit 605, system memory 610, and a bus 615 that couples various system components including the system memory 610 to the processing unit 605. The SoC 104 exemplified in FIG. 1 may contain appropriate ones of these components, e.g., the processing unit 605. The bus 615 may include any of several types of bus structures including a memory bus, memory controller, a peripheral bus, and a local bus using any of a variety of bus architectures, and the like. The bus 615 allows data to be transmitted between various components of the mobile device 600.

The mobile device 600 may include a variety of computer-readable media. Computer-readable media can be any available media that can be accessed by the mobile device 600 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, solid disk drives, magnetic disk storage or other magnetic storage devices, or any other medium which can be used to store the desired information and which can be accessed by the mobile device 600.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, near field communication (NFC) and other wireless media. Combinations of any of the above should also be included within the scope of computer-readable media.

The system memory 610 includes computer storage media in the form of volatile and/or nonvolatile memory and may include read only memory (ROM) and random access memory (RAM). On a mobile device such as a cell phone, operating system code 620 is sometimes included in ROM although, in other embodiments, this is not required. Similarly, application programs 625 are often placed in RAM although again, in other embodiments, application programs may be placed in ROM or in other computer-readable memory. The heap 630 provides memory for state associated with the operating system 620 and the application programs 625. For example, the operating system 620 and application programs 625 may store variables and data structures in the heap 630 during their operations.

The mobile device 600 may also include other removable/non-removable, volatile/nonvolatile memory. By way of example, FIG. 6 illustrates a flash card 635, a hard disk drive 636, and a memory stick 637. The hard disk drive 636 may be miniaturized to fit in a memory slot, for example. The mobile device 600 may interface with these types of non-volatile removable memory via a removable memory interface 631, or may be connected via a universal serial bus (USB), IEEE 1394, one or more of the wired port(s) 640, or antenna(s) 665. In these embodiments, the removable memory devices 635-637 may interface with the mobile device via the communications module(s) 632. In some embodiments, not all of these types of memory may be included on a single mobile device. In other embodiments, one or more of these and other types of removable memory may be included on a single mobile device.

In some embodiments, the hard disk drive 636 may be connected in such a way as to be more permanently attached to the mobile device 600. For example, the hard disk drive 636 may be connected to an interface such as parallel advanced technology attachment (PATA), serial advanced technology attachment (SATA) or otherwise, which may be connected to the bus 615. In such embodiments, removing the hard drive may involve removing a cover of the mobile device 600 and removing screws or other fasteners that connect the hard drive 636 to support structures within the mobile device 600.

The removable memory devices 635-637 and their associated computer storage media, discussed above and illustrated in FIG. 6, provide storage of computer-readable instructions, program modules, data structures, and other data for the mobile device 600. For example, the removable memory device or devices 635-637 may store images taken by the mobile device 600, voice recordings, contact information, programs, data for the programs and so forth.

A user may enter commands and information into the mobile device 600 through input devices such as a key pad 641 and the microphone 642. In some embodiments, the display 643 may be touch-sensitive screen and may allow a user to enter commands and information thereon. The key pad 641 and display 643 may be connected to the processing unit 605 through a user input interface 650 that is coupled to the bus 615, but may also be connected by other interface and bus structures, such as the communications module(s) 632 and wired port(s) 640. Motion detection 652 can be used to determine gestures made with the device 600.

A user may communicate with other users via speaking into the microphone 642 and via text messages that are entered on the key pad 641 or a touch sensitive display 643, for example. The audio unit 655 may provide electrical signals to drive the speaker 644 as well as receive and digitize audio signals received from the microphone 642.

The mobile device 600 may include a video unit 660 that provides signals to drive a camera 661. The video unit 660 may also receive images obtained by the camera 661 and provide these images to the processing unit 605 and/or memory included on the mobile device 600. The images obtained by the camera 661 may comprise video, one or more images that do not form a video, or some combination thereof.

The communication module(s) 632 may provide signals to and receive signals from one or more antenna(s) 665. One of the antenna(s) 665 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 672. In turn, the GPS mechanism 672 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 600 may connect to one or more remote devices. The remote devices may include a personal computer, a server, a router, a network PC, a cell phone, a media playback device, a peer device or other common network node, and typically includes many or all of the elements described above relative to the mobile device 600.

Aspects of the subject matter described herein are operational with numerous other general purpose or special purpose computing system environments or configurations. Examples of well-known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
maintaining protected data in on-System on Chip (SOC) secure storage, wherein the protected data comprises at least a secret state and access-protected data;
evicting at least some portion of the access-protected data to unsecure storage, the secret state not being allowed to be written to unsecure storage, the access-protected data only being accessed while stored in the on-SoC secure storage;
performing encryption or decryption processing on the access-protected data in the on-SoC secure storage, including accessing the on-SoC secure storage to access the secret state such that the secret state is not written to the unsecure storage; and
restoring the evicted access-protected data to the on-SoC secure storage.

2. The method of claim 1 wherein performing the encryption or decryption processing comprises performing encryption rounds, and preserving state of a completed encryption round until all rounds are completed.

3. The method of claim 1 wherein performing the encryption or decryption processing comprises verifying a personal identification number (PIN).

4. The method of claim 1 further comprising maintaining the access-protected data in a cache, including locking at least one cache line containing a subset of the access-protected data to prevent eviction from the cache.

5. The method of claim 4 further comprising writing the secret state to the cache line, wherein locking the cache line occurs before writing the secret state to the cache line.

6. The method of claim 4 further comprising, for a cache line containing the secret state that is to be unlocked, writing meaningless data over the secret state in the cache line, and unlocking the cache line, in which unlocking the cache line occurs after writing the meaningless data over the secret state.

7. The method of claim 6 further comprising, saving the secret state to another secure storage before writing the meaningless data over the secret state in the cache line.

8. The method of claim 1 further comprising, preparing for a context switch, including clearing the secret state from registers before the context switch.

9. The method of claim 1 further comprising, performing at least one encryption round as part of an encryption operation, tracking which encryption round is completed, and preparing for a context switch, including saving an encryption round block containing computational results of a previously completed encryption round to the on-SoC secure storage, and saving encryption round tracking information.

10. The method of claim 9 further comprising, resuming the encryption operation from a state corresponding to the previously completed encryption round, including reloading the encryption round block into the on-SoC secure storage, determining a next encryption round based upon the encryption round tracking information, and resuming encryption computations from the next encryption round.

11. A system comprising, on-System on Chip (SOC) secure storage, unsecure memory, secret state stored in said on-SoC secure storage, access-protected data stored in said on-SoC secure storage, and state protection logic coupled to the on-SoC secure storage, the state protection logic configured to maintain the secret state comprising a key, maintain a round block in the on-SoC secure storage during encryption operations, and allow the access-protected data to be evicted to the unsecure memory, the state protection logic further configured to prevent the secret state from entering the unsecure memory and to prevent the access-protected data from being accessed while the access-protected data is stored in the unsecure memory, and to restore the evicted access-protected data to the on-SoC secure storage.

12. The system of claim 11 wherein the on-SoC secure storage comprises a cache, in which the state protection logic prevents the secret state from entering the unsecure memory state by locking one or more cache lines containing the secret state.

13. The system of claim 11 in which the state protection logic is further configured to access only the access-protected data in the on-SoC secure storage while performing an encryption round computation.

14. The system of claim 13 wherein the on-SoC secure storage comprises a cache, in which the state protection logic locks the access-protected data in the cache while performing the encryption round computation.

15. The system of claim 13 wherein the state protection logic is further configured to track which encryption round is completed during the encryption round computation, and further comprising logic configured to prepare for a context switch, including by saving an encryption round block to the on-SoC secure storage and saving encryption round tracking information.

16. The system of claim 15 further comprising logic configured to resume from a context switch, determine a next encryption round based upon the encryption round tracking information, and resume the encryption round computation from the next encryption round.

17. One or more computer storage media having a secret state and an access-protected state stored in on-System on Chip (SoC) secure storage, unsecure memory, and computer-executable instructions which on execution perform operations comprising, protecting the secret state from entering the unsecure memory, including locking a cache line of an on-SOC cache, writing the secret state into the cache line only after locking the cache line, allowing the access-protected state to be evicted from the on-SoC secure storage to the unsecure memory, preventing the access-protected state from being accessed while stored in the unsecure memory, and restoring the evicted access-protected state to the on-SoC secure storage.

18. The one or more computer storage media of claim 17 having further computer executable instructions comprising, protecting the secret state from entering the unsecure memory, including writing meaningless information over the secret state, and unlocking the cache line only after writing the meaningless information.

19. The one or more computer storage-media of claim 17 having further computer executable instructions comprising: performing at least one encryption computation round; securely maintaining a round block comprising encryption computations for a latest round in the cache line in a locked state that prevents eviction of the round block to unsecure storage; tracking in a round index, the at least one encryption computation round; and preparing for a context switch, including saving the round index, saving the round block to another secure storage, and clearing registers comprising the secret state.

20. The one or more computer storage media of claim 19 having further computer executable instructions comprising, resuming the encryption computations, including restoring the round block, restoring a key, reading the round index to determine the at least one encryption computation round, and performing a next encryption computation round based upon the round index.

* * * * *